(12) United States Patent
Li

(10) Patent No.: US 11,939,001 B2
(45) Date of Patent: Mar. 26, 2024

(54) ADVANCED VEHICLE BODY FRONT SIDE FRAME STRUCTURE

(71) Applicant: HONDA MOTOR CO., LTD., Tokyo (JP)

(72) Inventor: Zhanhong Li, Guangzhou (CN)

(73) Assignee: HONDA MOTOR CO., LTD., Tokyo (JP)

( * ) Notice: Subject to any disclaimer, the term of this patent is extended or adjusted under 35 U.S.C. 154(b) by 87 days.

(21) Appl. No.: 17/567,179

(22) Filed: Jan. 3, 2022

(65) Prior Publication Data

US 2022/0274648 A1 Sep. 1, 2022

(30) Foreign Application Priority Data

Jan. 5, 2021 (CN) .......................... 202110004502.1

(51) Int. Cl.
*B62D 21/15* (2006.01)
*B62D 27/02* (2006.01)
(Continued)

(52) U.S. Cl.
CPC ........... *B62D 21/152* (2013.01); *B62D 27/02* (2013.01); *B62D 27/065* (2013.01); *B60R 19/34* (2013.01); *B62D 25/08* (2013.01); *B62D 25/082* (2013.01)

(58) Field of Classification Search
CPC .... B62D 21/152; B62D 27/02; B62D 27/065; B62D 25/082; B62D 25/08; B60R 19/34
(Continued)

(56) References Cited

U.S. PATENT DOCUMENTS 9,027,695 B2 * 5/2015 Nakamura ........... B62D 21/155
  293/133
9,925,937 B2 * 3/2018 Watanabe ............ B62D 21/152
(Continued)

FOREIGN PATENT DOCUMENTS

JP 2013-193571 9/2013
JP 2013193571 A * 9/2013 ........... B62D 21/152
(Continued)

OTHER PUBLICATIONS

Japanese Office Action for Japanese Patent Application No. 2022-000663 dated May 30, 2023.

*Primary Examiner* — Amy R Weisberg
*Assistant Examiner* — Dana D Ivey
(74) *Attorney, Agent, or Firm* — Amin, Turocy & Watson, LLP

(57) ABSTRACT

The present disclosure relates to a structure of a vehicle body front side member and relates to a technical field of automobile design and manufacture. A vehicle body front side member structure includes a front side member assembly, an upper side beam assembly, a front side member connection plate assembly, an upper side beam front assembly, a front anti-crash beam energy absorption box assembly, and a front anti-crash beam assembly. According to the front side member structure, it is possible to optimize the transmission route of the crash force and effectively improve the capability of the energy absorption of the front end of the vehicle body to reduce the load to the cabin stringer so as to reduce the invasion amount of the front cabin into the passenger cabin or avoid the front cabin from invading into the passenger cabin in order to improve the safety of the driver.

9 Claims, 10 Drawing Sheets

(51) Int. Cl.
*B62D 27/06* (2006.01)
*B60R 19/34* (2006.01)
*B62D 25/08* (2006.01)

(58) Field of Classification Search
USPC .............................. 296/187.09, 204; 293/133
See application file for complete search history.

(56) References Cited

U.S. PATENT DOCUMENTS

| | | |
|---|---|---|
| 2016/0207573 A1 | 7/2016 | Kitakata et al. |
| 2016/0332588 A1 | 11/2016 | Watanabe et al. |
| 2018/0334121 A1 | 11/2018 | Sabu et al. |

FOREIGN PATENT DOCUMENTS

| | | |
|---|---|---|
| JP | 2015-054591 | 3/2015 |
| JP | 2016-210336 | 12/2016 |
| JP | 2016-222248 | 12/2016 |
| JP | 2018-192884 | 12/2018 |

* cited by examiner

ADVANCED VEHICLE BODY FRONT SIDE FRAME STRUCTURE

TECHNICAL FIELD

The present disclosure relates to a technical field of design and manufacture of a vehicle. Particularly, the present disclosure relates to a structure of a vehicle body front side member.

BACKGROUND ART

Nowadays, consumers of automobiles emphasize the safety evaluation of automobile crash test. Here, an offset crash test as an evaluation item includes a 25% offset crash and a 40% offset crash. That is, an overlap area between the vehicle and the crash object is equivalent to 25% and 40% of a width of the vehicle. If the overlap area is smaller, the impact pressure received by the automobile becomes larger such that the vehicle body crashworthiness performance is required more strictly.

With regard to the majority of automobile models in the market, the transmission of the crash force is performed mainly via the front side member so as to reduce the invasion amount of the front cabin into the passenger cabin. However, there is only a single transmission route for the crash force and there is no closed loop structure is formed such that in most situations, the rigidity and the strength are increased by adding a reinforcing plate or increasing the plate thickness. Even such measures are taken, it is still impossible to fulfil the requirement of the crash regulations and there are further problems remained such as the welding is difficult, the material cost is high and the like. With conventional technology, during the process of the 25% offset crash, since the crash points are different, when the vehicle is crashed, the crash block does not completely come into contact with the front side member to transmit the force and only a certain bending deformation is generated. Accordingly, the crash force is mainly absorbed through the upper side beam such that the upper side member is terribly bent and the cabin invades into the passenger cabin. This is the main reason for the A-pillar to be bent during the 25% crash test of the majority of automobile models at nowadays.

FIG. 1 and FIG. 2 are schematic views showing a transmission (shown by arrows in the figures) of the crash force during the 40% offset crash or the frontal crash, and the 25% offset crash for the vehicle body front side member according to the conventional technology. With regard to the structure of the above-described vehicle body front side member, the transmission route is relatively monochromic such that the transmission effect for the force cannot be suitably performed and the front side member cannot transmit the crash force.

SUMMARY

In order to solve the above-described technical problem, the present disclosure provides a structure of a vehicle body front side member.

A vehicle body front side member structure according to the present disclosure includes a front side member assembly, an upper side beam assembly, a front side member connection plate assembly, an upper side beam front assembly, a front anti-crash beam energy absorption box assembly, and a front anti-crash beam assembly, wherein the front side member connection plate assembly includes a front side member connection plate body, the front side member connection plate body includes a box body with an opening, a front side member connection reinforcing plate is disposed on a bottom wall being opposite to the opening in the box body, an energy absorption box mounting bracket is disposed on a front wall of the box body, a front side member connection sealing plate is disposed on a back wall of the box body, the box body is formed to have a cross section with an area gradually decreased as from the front wall toward the back wall, the front side member connection plate body and the front side member connection sealing plate are welded to the front side member assembly, the bottom wall of the box body is welded and fixed to a front end of the upper side beam front assembly, the energy absorption box mounting bracket and the front anti-crash beam energy absorption box assembly are fixed by screws, a rear end of the upper side beam front assembly and the upper side beam assembly are fixed by welding, and the front anti-crash beam energy absorption box assembly is connected to each of the front anti-crash beam assembly, the front side member assembly, and the front side member connection plate assembly.

Two sides of the front side member connection reinforcing plate are extending to an upper wall and a lower wall of the box body.

An outer end of the upper wall and an outer end of the lower wall are provided with a welding flange, and the welding flange of the front side member connection plate body is welded to the front side member assembly.

The front anti-crash beam energy absorption box assembly is configured from an energy absorption box body, an energy absorption box mounting plate, and an energy absorption box front sealing plate.

The energy absorption box body is configured from an energy absorption box upper plate, an energy absorption box lower plate, and an energy absorption box inner plate, two sides of the energy absorption box upper plate and the energy absorption box lower plate are welded to form a cavity structure with openings at a front surface and a rear surface thereof, the energy absorption box inner plate is provided between the energy absorption box upper plate and the energy absorption box lower plate and connected to the inner surfaces of the energy absorption box upper plate and the energy absorption box lower plate by being welded at points.

The energy absorption box mounting plate is disposed on a rear end surface of the energy absorption box body, and the energy absorption box front sealing plate is fixed to a front end surface of the energy absorption box body.

The energy absorption box front sealing plate is welded and fixed to the front anti-crash beam assembly, and the energy absorption box mounting plate is connected and fixed to a front end of the front side member assembly by screws.

The energy absorption box mounting plate and the energy absorption box mounting bracket of the front side member connection plate assembly are connected and fixed with each other by screws.

The energy absorption box body has a cross section with an area gradually increasing as from the front end toward the rear end.

The upper side beam front assembly is configured from an upper side beam front outer plate, an upper side beam front inner plate, and an upper side beam front reinforcing plate, the upper side beam front reinforcing plate is welded to the upper side beam front inner plate, and the upper side beam front outer plate is welded to the upper side beam front inner plate.

Advantageous Effects of Invention

Compared to the conventional technology, the vehicle body front side member according to the present disclosure has the following advantageous effects.

According to the vehicle body front side member, by optimizing the route for the force transmission, it is possible to effectively improve the capability of absorbing the energy of the vehicle body front end and reduce the load to the cabin stringer so as to avoid the front cabin from invading into the passenger cabin or reduce the invasion amount to improve the safety of the driver.

DESCRIPTION OF EMBODIMENTS

Hereinafter, a vehicle body front side member structure according to the present disclosure will be described by referring to a specific embodiment so as to make a person with ordinary skill in the art to more comprehensively and correctly to understand the technical features of the present disclosure in details.

First Embodiment

Figure 1:
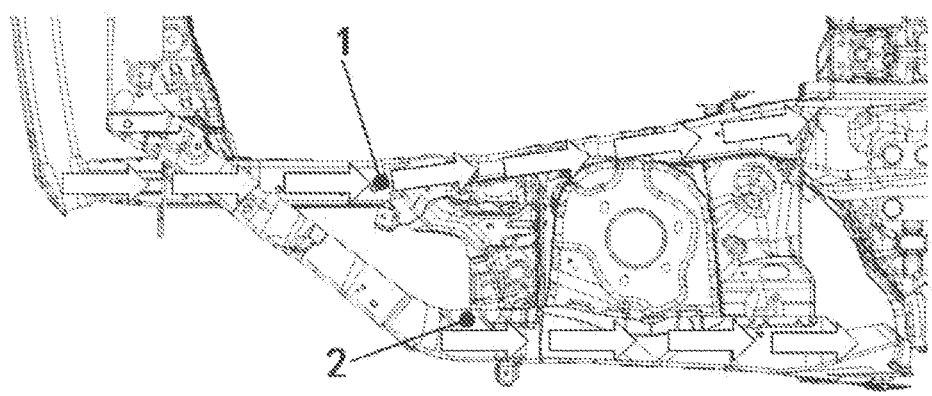
FIG. 1 is a schematic view showing a transmission of crash force in a 40% offset crash or a 100% frontal crash to a vehicle body front side member structure according to the conventional technology.
Figure 2:
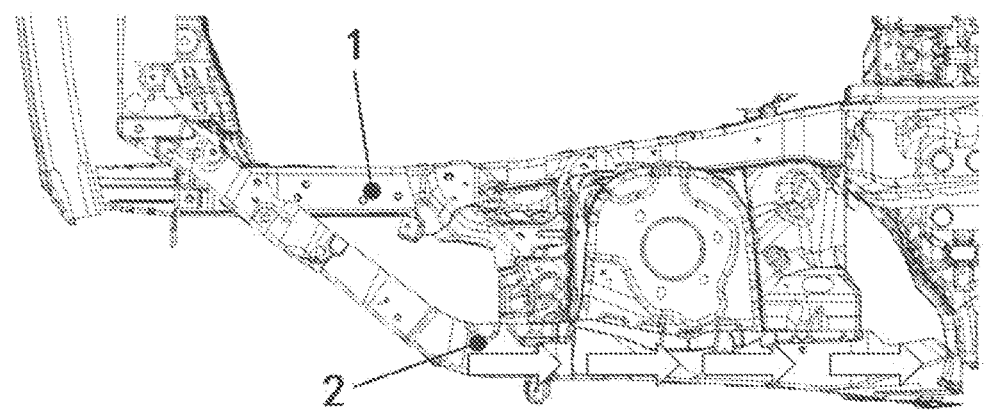
FIG. 2 is a schematic view showing a transmission of crash force in a 25% offset crash to the vehicle body front side member structure according to the conventional technology.
Figure 3:
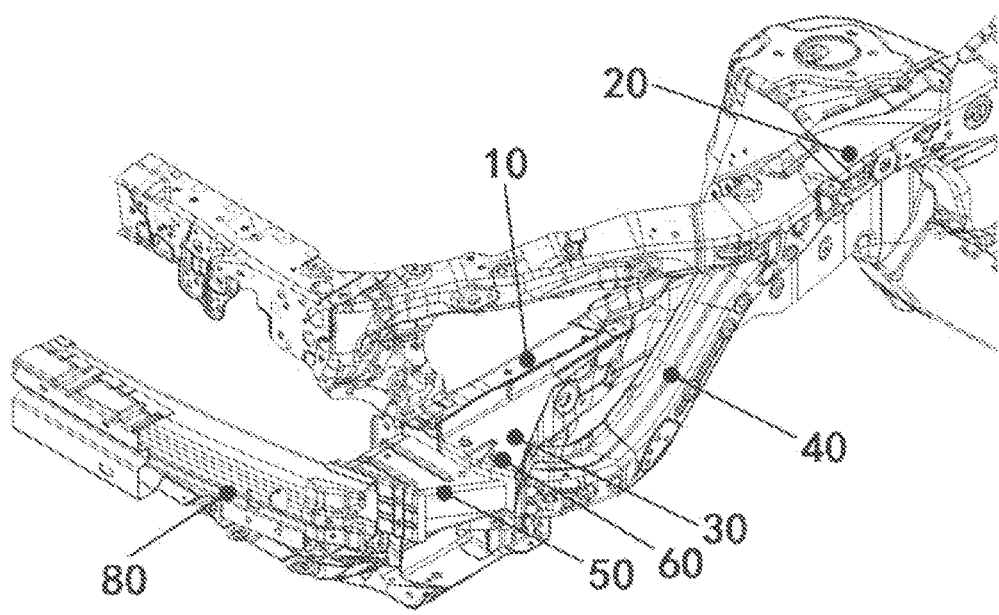
FIG. 3 is a perspective view showing a vehicle body front side member structure according to the present disclosure.
Figure 4:
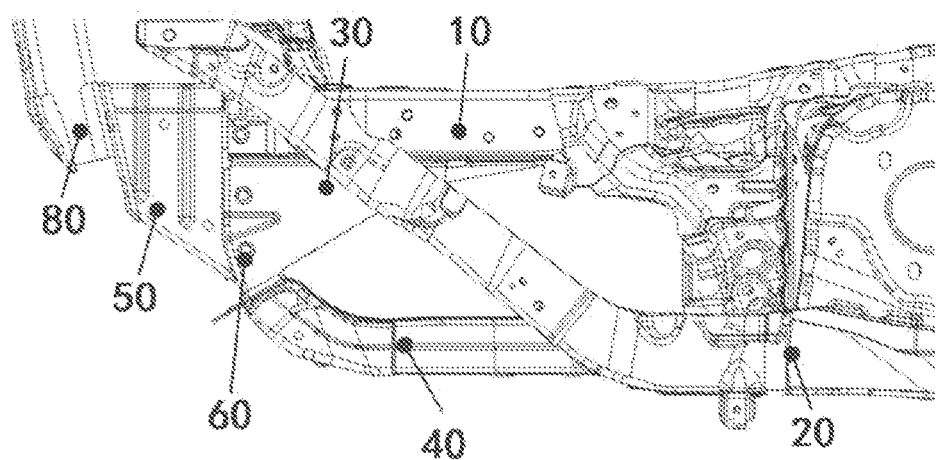
FIG. 4 is a top view showing the vehicle body front side member structure according to the present disclosure.
Figure 5:
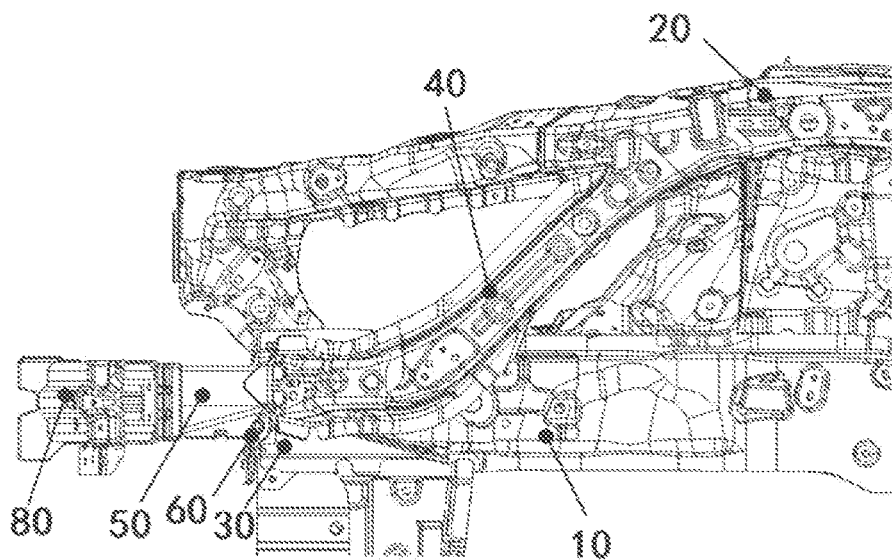
FIG. 5 is a front view showing the vehicle body front side member structure according to the present disclosure.
Figure 6:
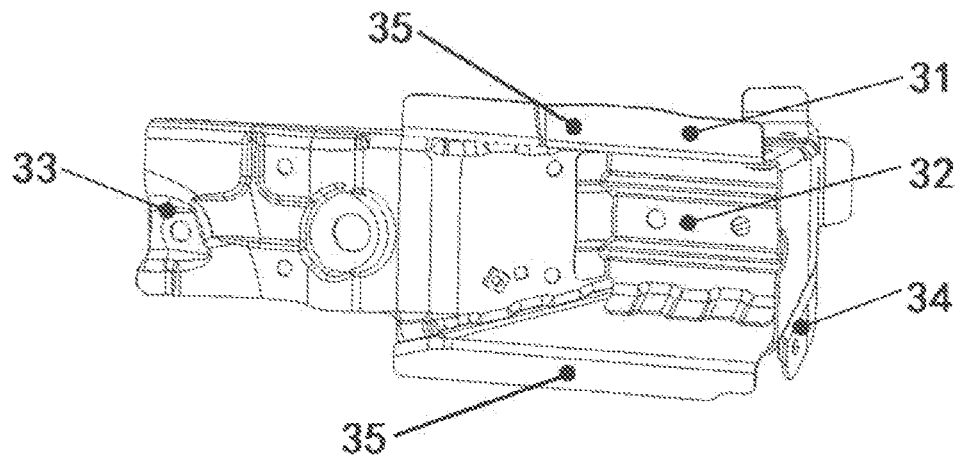
FIG. 6 is a three-dimensional view showing a front side member connection plate assembly according to the present disclosure.
Figure 7:
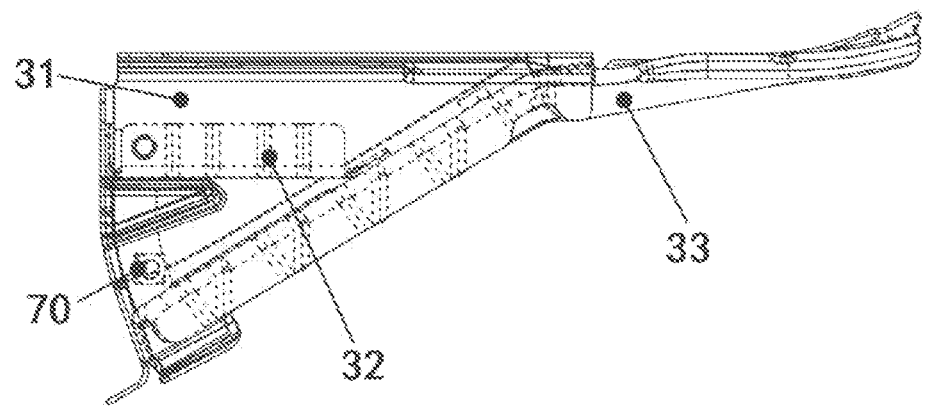
FIG. 7 is a top view showing the front side member connection plate assembly according to the present disclosure.
Figure 8:
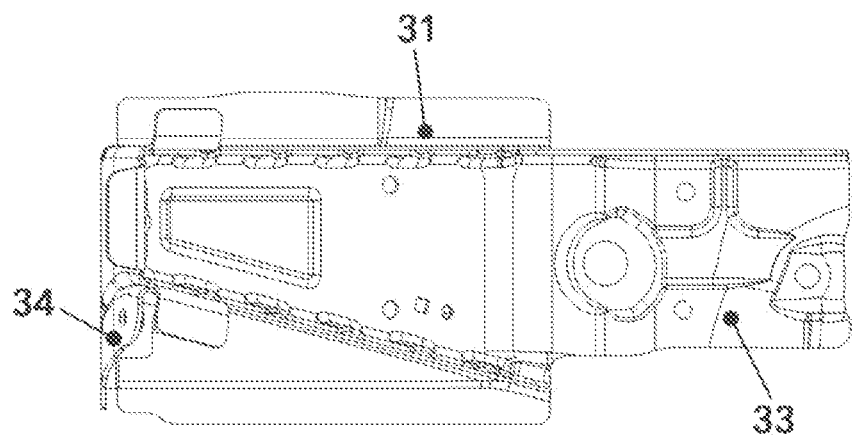
FIG. 8 is a front view showing the front side member connection plate assembly according to the present disclosure.
Figure 9:
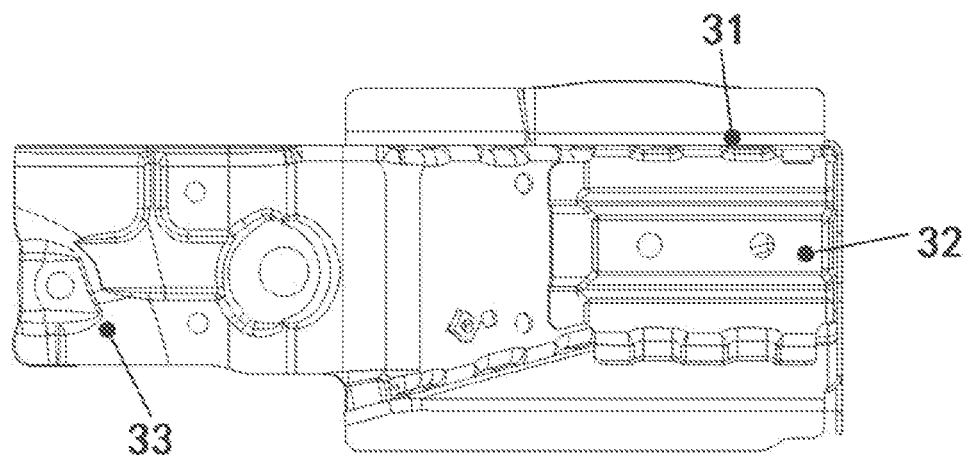
FIG. 9 is a back view showing the front side member connection plate assembly according to the present disclosure.
Figure 10:
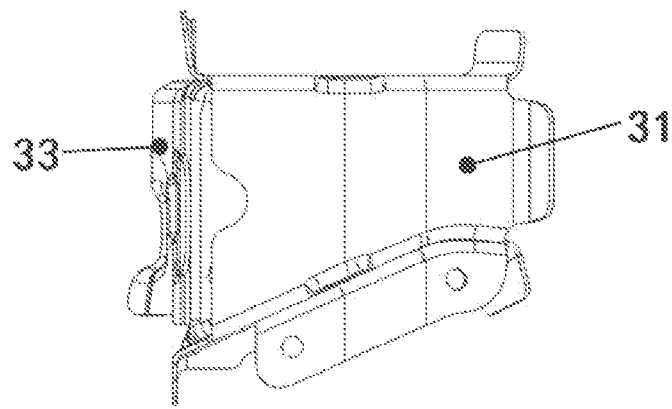
FIG. 10 is a left side view showing the front side member connection plate assembly according to the present disclosure.

As shown in FIG. 3 to FIG. 5, the vehicle body front side member structure according to the present embodiment includes a front side member assembly 10, an upper side beam assembly 20, a front side member connection plate assembly 30, an upper side beam front assembly 40, a front anti-crash beam energy absorption box assembly 50, and a front anti-crash beam assembly 60.

Figure 19:
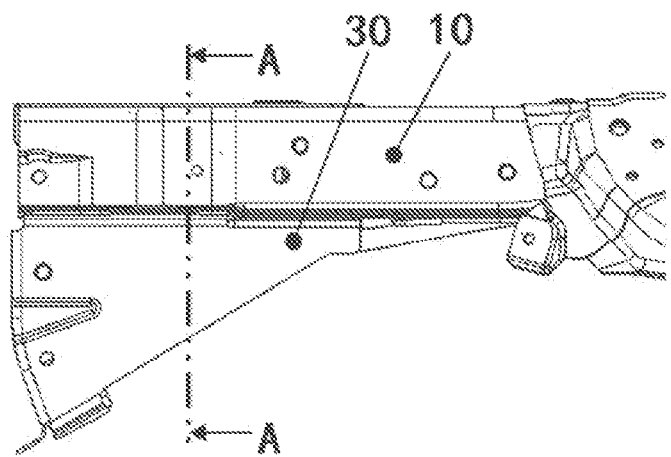
FIG. 19 is an assembly diagram of the front side member assembly and the front side member connection plate assembly.
Figure 20:
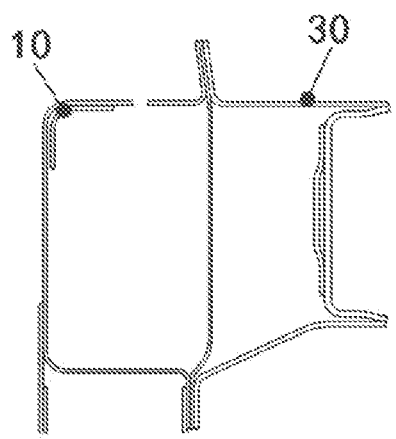
FIG. 20 is a schematic view showing a cross-sectional structure along an A-A direction shown in FIG. 19.
Figure 21:
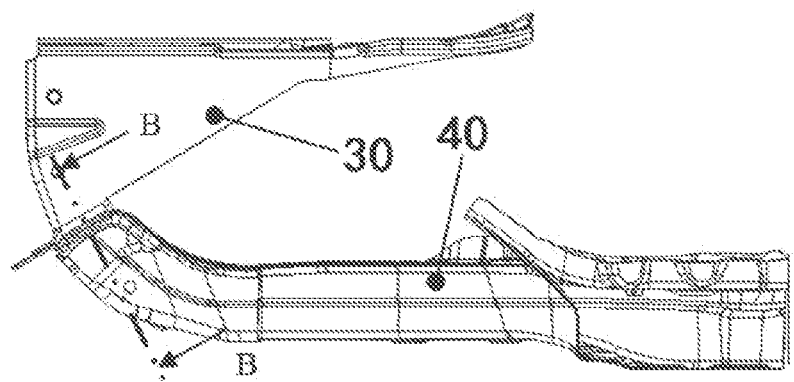
FIG. 21 is an assembly diagram of the front side member connection plate assembly and the upper side beam front assembly.
Figure 22:
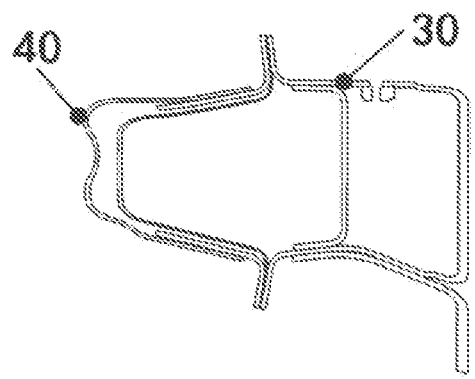
FIG. 22 is a schematic view showing a cross-sectional structure along a B-B direction shown in FIG. 21.

As shown in FIG. 6 to FIG. 10, the front side member connection plate assembly 30 includes a front side member connection plate body 31. The front side member connection plate body 31 includes a box body with an opening. A front side member connection reinforcing plate 32 is disposed on a bottom wall being opposite to the opening in the box body, and two sides of the front side member connection reinforcing plate 32 are extending to an upper wall and a lower wall of the box body. An energy absorption box mounting bracket 34 is disposed on a front wall of the box body, a front side member connection sealing plate 33 is disposed on a back wall of the box body. A welding flange 35 is provided in an outer end of the upper wall and an outer end of the lower wall. The box body is formed to have a cross section with an area gradually decreased as from the front wall toward the back wall so as to guide the crash force to the front side member assembly 10 and transmitting part of the crash force from the bottom wall to the upper side beam front assembly. As shown in FIG. 19 and FIG. 20, the welding flange 35 of the front side member connection plate body 31 and the front side member connection sealing plate 33 are welded to the front side member assembly 10. The bottom wall of the box body is welded and fixed to a front end of the upper side beam front assembly 40.

As shown in FIG. 14 to FIG. 18, the front anti-crash beam energy absorption box assembly 50 is configured from an energy absorption box body 51, an energy absorption box mounting plate 55, and an energy absorption box front sealing plate 56. The energy absorption box body 51 is configured from an energy absorption box upper plate 52, an energy absorption box lower plate 53, and an energy absorption box inner plate 54. Two sides of the energy absorption box upper plate 52 and the energy absorption box lower plate 53 are welded to form a cavity structure with openings at a front surface and a rear surface thereof. The energy absorption box inner plate 54 is provided between the energy absorption box upper plate 52 and the energy absorption box lower plate 53 and connected to the inner surfaces of the energy absorption box upper plate 52 and the energy absorption box lower plate 53 by being welded at points. The energy absorption box mounting plate 55 is disposed on a rear end surface of the energy absorption box body 51 by the MIG welding, and the energy absorption box front sealing plate 56 is fixed to a front end surface of the energy absorption box body 51 by the MIG welding. As shown in FIG. 3 to FIG. 5 and FIG. 25 to FIG. 28, the energy absorption box front sealing plate 56 and the front anti-crash beam assembly 80 are connected and fixed by the MIG welding, and the energy absorption box mounting plate 55 and the front end of the front side member assembly 10 are connected and fixed by the screw 60 and the projection welding nut 70. The energy absorption box mounting plate 55 and the energy absorption box mounting bracket 34 of the front side member connection plate assembly 30 are connected and fixed by the screw 60 and the projection welding nut 70. The energy absorption box body 51 is designed to have a cross section with an area gradually increasing from the front end toward the rear end such that it is beneficial for the crash force to be transmitted from the front anti-crash beam assembly to the front side member assembly 10 and the front side member connection plate assembly 30.

Figure 11:
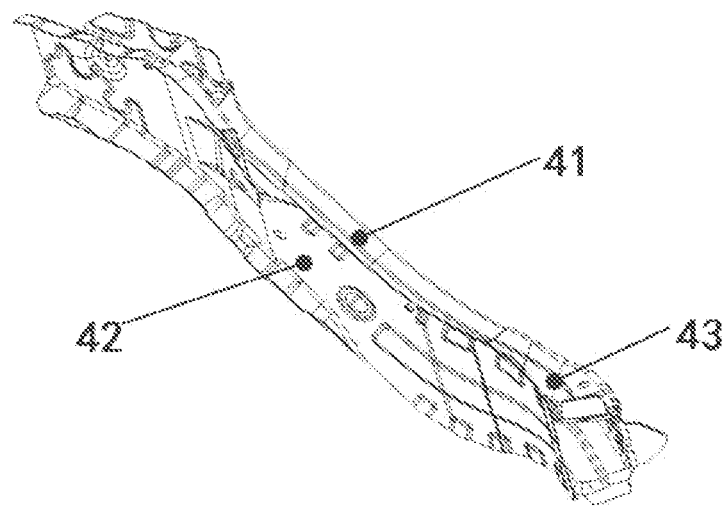
FIG. 11 is a three-dimensional view showing an upper side beam front assembly according to the present disclosure.
Figure 12:
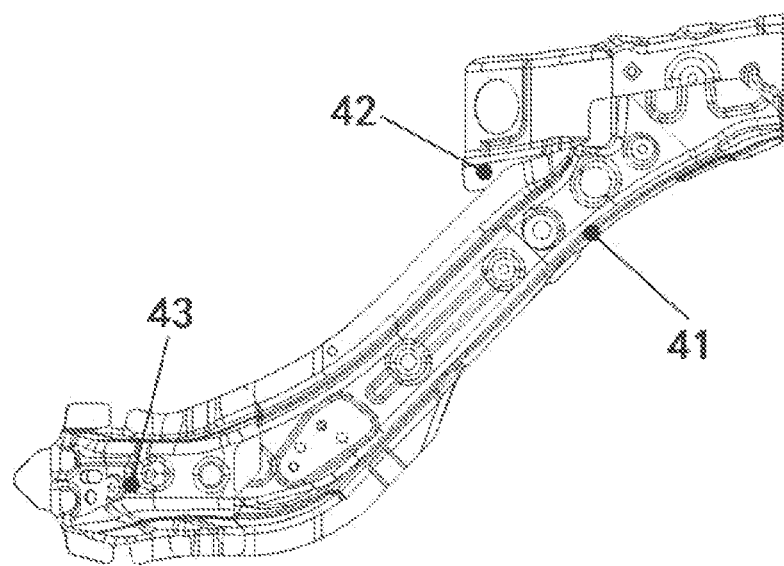
FIG. 12 is a front view showing the upper side beam front assembly according to the present disclosure.
Figure 13:
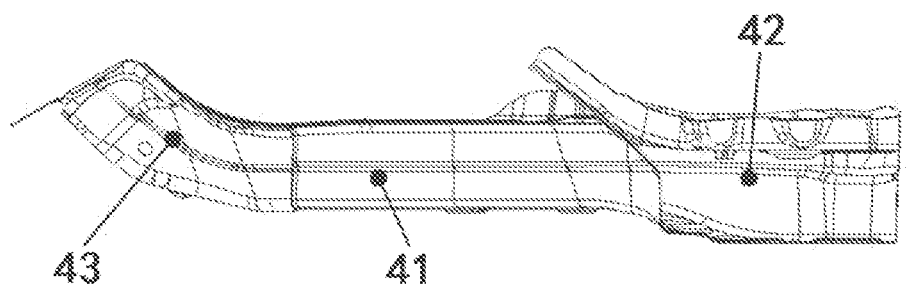
FIG. 13 is a top view showing the upper side beam front assembly according to the present disclosure.
Figure 14:
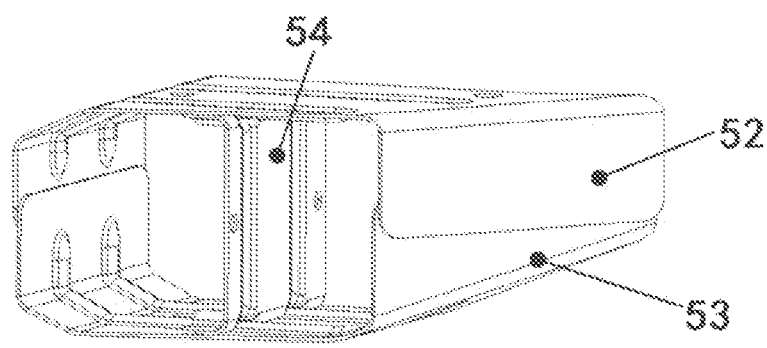
FIG. 14 is a three-dimensional view showing an energy absorption box body assembly according to the present disclosure.
Figure 15:
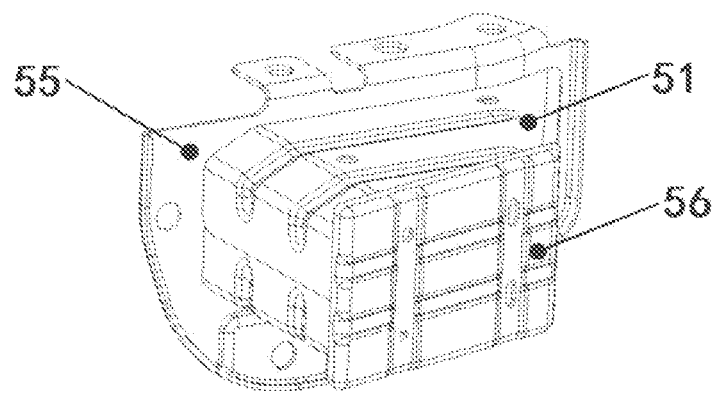
FIG. 15 is a three-dimensional view showing a front anti-crash beam energy absorption box assembly.
Figure 16:
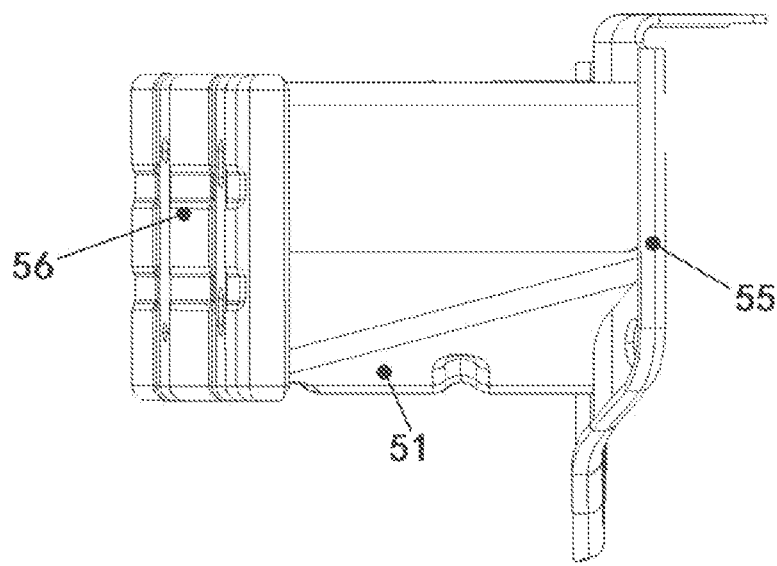
FIG. 16 is a front view showing the front anti-crash beam energy absorption box assembly.
Figure 17:
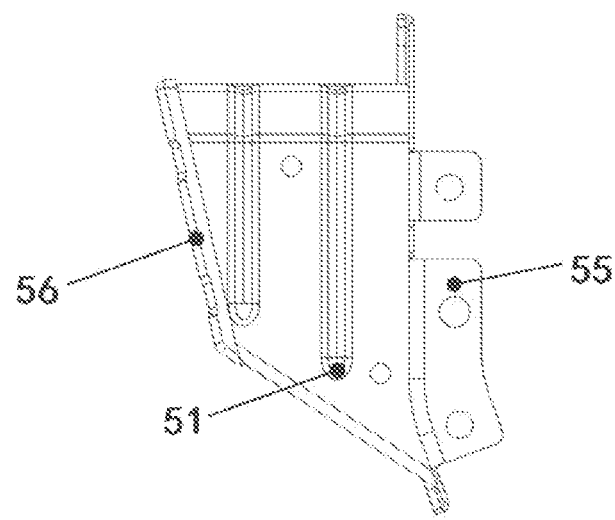
FIG. 17 is a top view showing the front anti-crash beam energy absorption box assembly.
Figure 18:
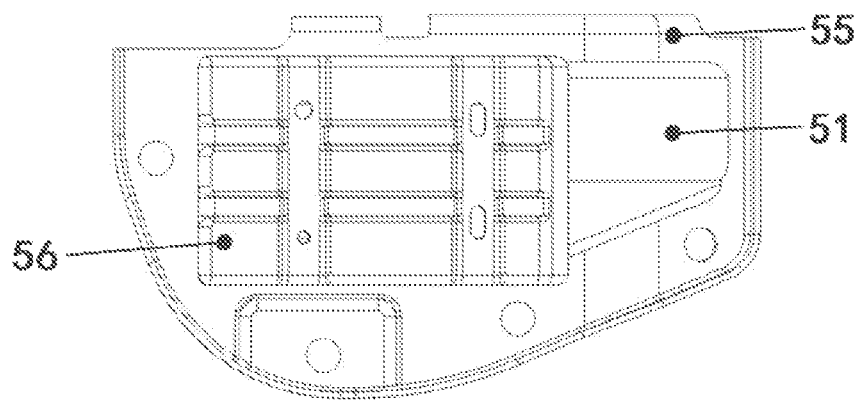
FIG. 18 is a left side view showing the front anti-crash beam energy absorption box assembly.

As shown in FIG. 11 to FIG. 13, the upper side beam front assembly 40 is configured from an upper side beam front outer plate 41, an upper side beam front inner plate 42, and an upper side beam front reinforcing plate 43. The upper side beam front reinforcing plate 43 is welded to the upper side beam front inner plate 42, and the upper side beam front outer plate 41 is welded to the upper side beam front inner plate 42.

Figure 23:
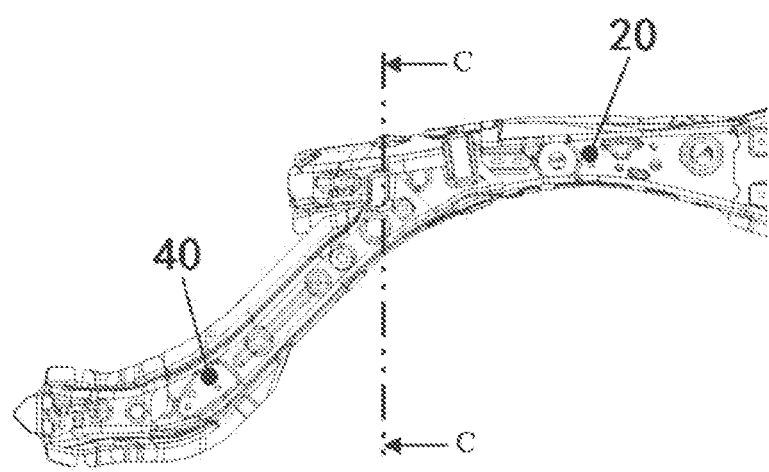
FIG. 23 is an assembly view of the upper side beam front assembly and the upper side beam assembly.
Figure 24:
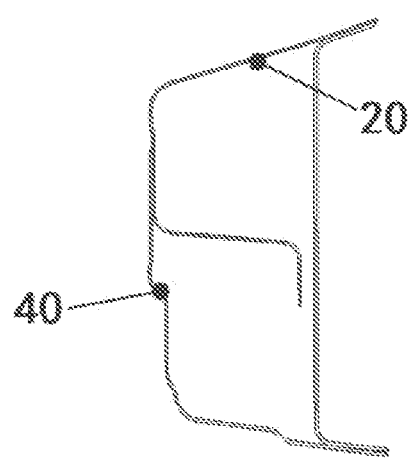
FIG. 24 is a schematic view showing a cross-sectional structure along a C-C direction shown in FIG. 23.
Figure 25:
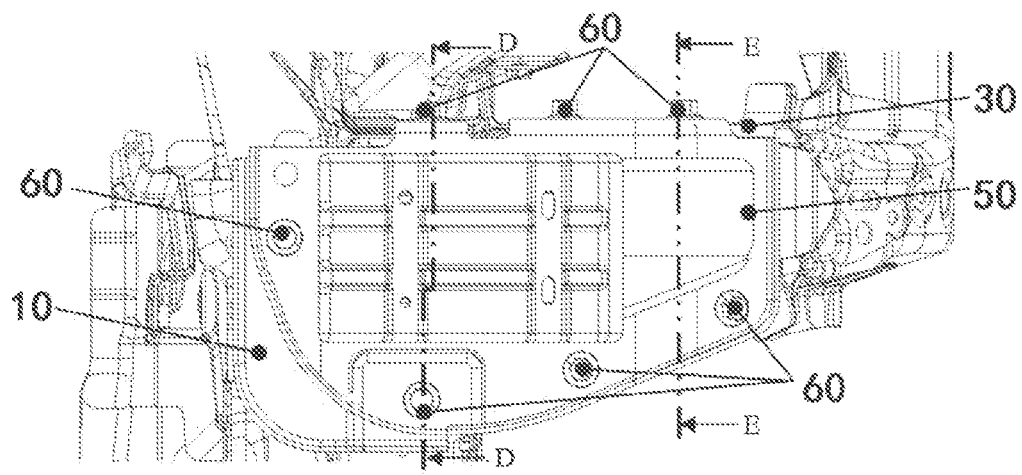
FIG. 25 is an assembly view of the front anti-crash energy absorption box assembly according to the present disclosure.
Figure 26:
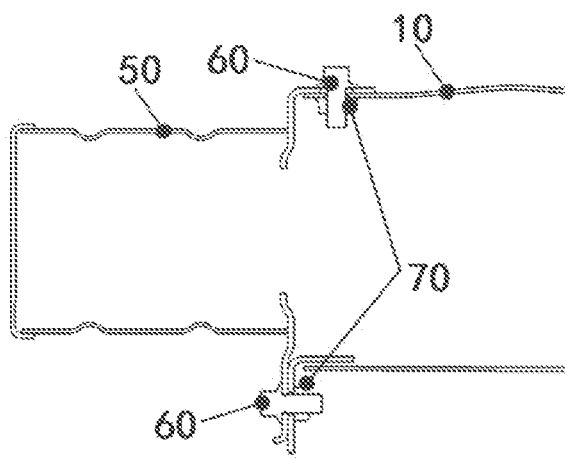
FIG. 26 is a schematic view showing a cross-sectional structure along a D-D direction shown in FIG. 25.
Figure 27:
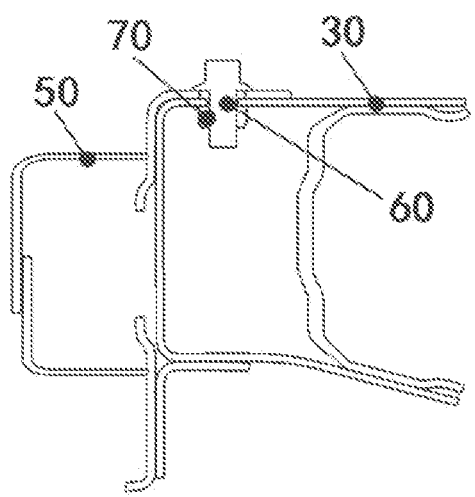
FIG. 27 is a schematic view showing a cross-sectional structure along an E-E direction shown in FIG. 25.
Figure 28:
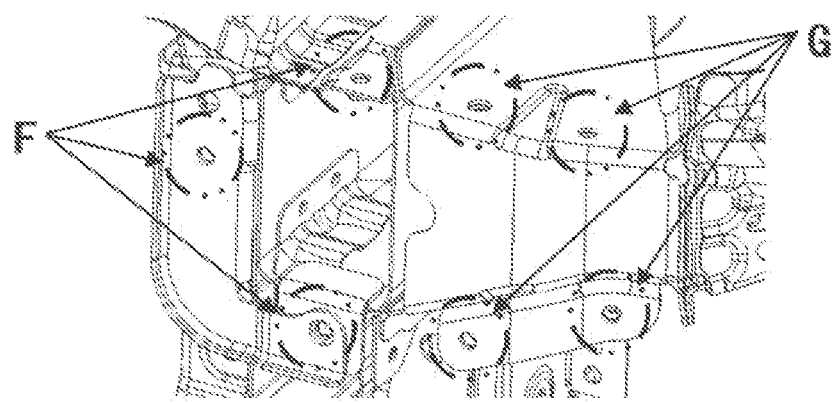
FIG. 28 is a schematic view showing a mounting point of the front anti-crash energy absorption box assembly according to the present disclosure.

As shown in FIG. 23 and FIG. 24, the rear end of the upper side beam front assembly 40 is welded to the upper side beam assembly 20.

Figure 29:
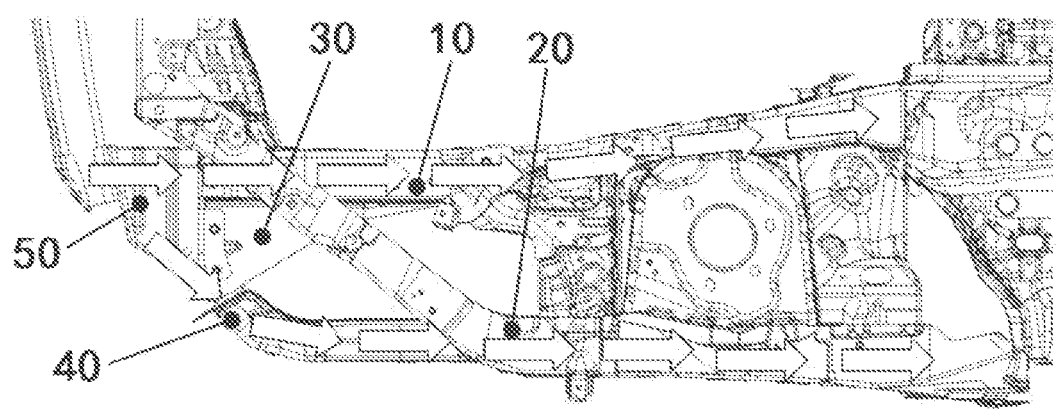
FIG. 29 is a schematic view showing a transmission of crash force to the vehicle body front side member structure according to the present disclosure.

FIG. 29 is a schematic view showing the transmission of the crash force during the offset crash test (including the 25% offset crash test and the 40% offset crash test) or the frontal crash test. According to the present embodiment, due to the front side member connection plate assembly and the upper side beam front assembly, particularly since the front side member connection plate assembly has a special structural design to connect the front anti-crash beam energy absorption box assembly, the front side member assembly, and the upper side beam front assembly. Due to such a structure, it is possible to effectively transmit the crash force to the front side member assembly and the upper side beam assembly via the upper side beam front assembly and optimize the transmission route of the crash force so as to reduce the invasion amount of the front cabin into the passenger cabin or avoid the front cabin from invading into the passenger cabin in order to improve the safety of the driver. Due to the structural design and the combination of the front anti-crash beam energy absorption box assembly and the front side member connection plate assembly, it is possible to significantly upgrade the capability of the energy absorption of the front end of the vehicle body and significantly enhance the energy absorption effects by the front anti-crash beam assembly. Accordingly, it is possible to ensure that the damage is only occurred in the anti-crash beam assembly so as to reduce the load to the cabin stringer and avoid the damage to the skeleton structure of the cabin. Accordingly, after the serious crash has occurred, it is only necessary to exchange the anti-crash beam assembly so as to reduce the repair cost. According to the vehicle body front side member structure according to the present embodiment, it is possible to reduce the demand for the strength of the cabin stringer and suitably reduce the material characteristic of the cabin stringer such as the thickness of the material, the grade of the strength or the like to achieve the goals of the cost reduction and the weight reduction.

For the person with ordinary skill in the art, the specific embodiments are only used to describe the present disclosure as examples. The specific embodiments of the present invention are not limited by the above-described methods. Various non-substantial improvements that employ the methods and technical features in the spirit of the present disclosure are included in the scope of the present disclosure.

What is claimed is:

1. A vehicle body front side member structure, comprising:
   a front side member assembly;
   an upper side beam assembly;
   a front side member connection plate assembly;
   an upper side beam front assembly;
   a front anti-crash beam energy absorption box assembly; and
   a front anti-crash beam assembly, wherein
   the front side member connection plate assembly includes a front side member connection plate body,
   the front side member connection plate body includes a box body with an opening,
   a front side member connection reinforcing plate is disposed on a bottom wall being opposite to the opening in the box body,
   an energy absorption box mounting bracket is disposed on a front wall of the box body,
   a front side member connection sealing plate is disposed on a back wall of the box body,
   the box body is formed to have a cross section with an area gradually decreased as from the front wall toward the back wall,
   the front side member connection plate body and the front side member connection sealing plate are welded to the front side member assembly,
   the bottom wall of the box body is welded and fixed to a front end of the upper side beam front assembly,
   the energy absorption box mounting bracket and the front anti-crash beam energy absorption box assembly are fixed by screws,
   a rear end of the upper side beam front assembly and the upper side beam assembly are fixed by welding, and
   the front anti-crash beam energy absorption box assembly is connected to each of the front anti-crash beam assembly, the front side member assembly, and the front side member connection plate assembly,
   the front anti-crash beam energy absorption box assembly has an energy absorption box body, and
   a lateral outer wall of the energy absorption box body is inclined outwards in a vehicle width direction as from the front end toward the rear end such that the energy absorption box body has a cross section with an area gradually increasing as from the front end toward the rear end.

2. The vehicle body front side member structure according to claim 1, wherein two sides of the front side member connection reinforcing plate are extending to an upper wall and a lower wall of the box body.

3. The vehicle body front side member structure according to claim 2, wherein an outer end of the upper wall and an outer end of the lower wall are provided with a welding flange, and the welding flange of the front side member connection plate body is welded to the front side member assembly.

4. The vehicle body front side member structure according to claim 1, wherein the front anti-crash beam energy absorption box assembly is configured from an energy absorption box body, the energy absorption box mounting plate, and an energy absorption box front sealing plate.

5. The vehicle body front side member structure according to claim 4, wherein the energy absorption box body is configured from an energy absorption box upper plate, an energy absorption box lower plate, and an energy absorption box inner plate, two sides of the energy absorption box upper plate and the energy absorption box lower plate are welded to form a cavity structure with openings at a front surface and a rear surface thereof, and the energy absorption box inner plate is provided between the energy absorption box upper plate and the energy absorption box lower plate and connected to the inner surfaces of the energy absorption box upper plate and the energy absorption box lower plate by being welded at points.

6. The vehicle body front side member structure according to claim 5, wherein the energy absorption box mounting plate is disposed on a rear end surface of the energy absorption box body, and the energy absorption box front sealing plate is fixed to a front end surface of the energy absorption box body.

7. The vehicle body front side member structure according to claim 6, wherein the energy absorption box front sealing plate is welded and fixed to the front anti-crash beam assembly, and the energy absorption box mounting plate is connected and fixed to a front end of the front side member assembly by screws.

8. The vehicle body front side member structure according to claim 6, wherein the energy absorption box mounting plate and the energy absorption box mounting bracket of the front side member connection plate assembly are connected and fixed with each other by screws.

9. The vehicle body front side member structure according to claim 1, wherein the upper side beam front assembly is configured from an upper side beam front outer plate, an upper side beam front inner plate, and an upper side beam front reinforcing plate, the upper side beam front reinforcing plate is welded to the upper side beam front inner plate, and the upper side beam front outer plate is welded to the upper side beam front inner plate.

* * * * *